(12) United States Patent
McCann

(10) Patent No.: US 8,985,217 B2
(45) Date of Patent: Mar. 24, 2015

(54) METHOD, DEVICE, AND SYSTEM FOR DETERMINING WATER OR LIQUID IN THE ANNULUS OF A FLEXIBLE RISER OR FLOWLINE

(75) Inventor: Dominic McCann, Romsey Hampshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 444 days.

(21) Appl. No.: 13/120,429

(22) PCT Filed: Sep. 24, 2009

(86) PCT No.: PCT/US2009/058203
§ 371 (c)(1),
(2), (4) Date: May 23, 2011

(87) PCT Pub. No.: WO2010/036792
PCT Pub. Date: Apr. 1, 2010

(65) Prior Publication Data
US 2011/0247826 A1    Oct. 13, 2011

Related U.S. Application Data

(60) Provisional application No. 61/099,573, filed on Sep. 24, 2008.

(51) Int. Cl.
| E21B 49/00 | (2006.01) |
| E21B 47/10 | (2012.01) |
| E21B 17/01 | (2006.01) |
| G01M 3/28 | (2006.01) |

(52) U.S. Cl.
CPC .............. *E21B 47/10* (2013.01); *E21B 17/015* (2013.01); *G01M 3/2815* (2013.01)
USPC ........... 166/336; 166/337; 166/350; 166/367; 166/250.01

(58) Field of Classification Search
USPC ......... 166/336, 337, 344, 345, 350, 355, 359, 166/367
See application file for complete search history.

(56) References Cited

U.S. PATENT DOCUMENTS

| 3,972,223 | A | | 8/1976 | Torghele |
| 4,386,269 | A | | 5/1983 | Murphy |
| 4,509,558 | A | * | 4/1985 | Slater ........................... 138/104 |
| 4,812,014 | A | | 3/1989 | Sawano |

(Continued)

FOREIGN PATENT DOCUMENTS

EP      1492936      1/2006

*Primary Examiner* — James G Sayre
(74) *Attorney, Agent, or Firm* — Chamberlain Hrdlicka

(57) ABSTRACT

A method, device, and system for determining whether liquid enters a subsea system includes a flow line having an inside bore capable of carrying producing fluids from a subsea wellhead to a floating production storage and offloading vessel (FPSO). An annulus is defined between an innermost sheath that surrounds the inside bore and an outermost sheath at an exterior of the flow line. The device further includes a housing element disposed within the annulus and in hydraulic communication with the annulus; a sensor element disposed at a predetermined location within the housing element; and data acquisition equipment capable of: determining environmental characteristics of the annulus based on measurements made by the sensor element, and determining at least one of the presence, location, and rate of collection of liquids in the subsea system based on the environmental characteristics of the annulus.

14 Claims, 5 Drawing Sheets

(56) References Cited

U.S. PATENT DOCUMENTS

| | | | |
|---|---|---|---|
| 5,551,484 A * | 9/1996 | Charboneau | 138/104 |
| 7,135,870 B2 * | 11/2006 | Mohajer et al. | 324/639 |
| 7,387,012 B2 * | 6/2008 | Spaolonzi et al. | 73/49.1 |
| 7,578,350 B2 * | 8/2009 | Cooper et al. | 166/368 |
| 2006/0245469 A1 * | 11/2006 | Koeniger | 374/208 |

* cited by examiner

METHOD, DEVICE, AND SYSTEM FOR DETERMINING WATER OR LIQUID IN THE ANNULUS OF A FLEXIBLE RISER OR FLOWLINE

CROSS-REFERENCE TO RELATED APPLICATIONS

This application, pursuant to 35 U.S.C. §119(e), claims priority to U.S. Provisional Application Ser. No. 61/099,573, filed Sep. 24, 2009. That application is incorporated by reference in its entirety.

FIELD OF DISCLOSURE

Embodiments disclosed herein generally relate to a device, method, and system for determining the presence of liquids in the annulus of a flexible riser or flow line in a subsea system.

BACKGROUND

Subsea production for many oil companies is projected to increase significantly in the next 5-10 years. In addition, offshore fields are being exploited in deeper and deeper waters. However, producing from floating production, storage, and offloading vessel (FPSO) presents many challenges, which increase as the water depth increases.

Referring to FIG. 1, produced fluids are often carried from a wellhead 10 on the seabed 20 to an FPSO 30 through flow lines such as flexible risers 100. Additionally, a riser clamp 40 and tethers 50 may be employed to retain the end of the flexible riser 100 to the seabed 20, while buoyancy modules 60 may be connected to various positions along the flexible riser 100 and a bend stiffener 80 may be included at the connection to FPSO 30 so as to allow for surface movement of the FPSO 30 and movements due to wave action without putting undue stress upon the flexible riser 100. As labeled in FIG. 1, the bends created in the flexible riser 100 by the buoyancy modules 60 are commonly referred to as "hog bends" at high points and "sag bends" at low points.

Flexible risers 100 bring many advantages allowing produced fluids to flow from the fixed seabed wellhead 10 to the FPSO 30, which will move with tidal and wave action. Additionally, flexible risers 100 may be manufactured in long continuous lengths that allow for a simpler and more efficient installation. The use of flexible risers 100 is well documented and known to one of ordinary skill in the art.

Referring to FIG. 2, a typical flexible structure 100 consists of many layers, each of which plays a different role from providing structural strength to providing isolation between the inside bore 102, which carries producing fluids, from the outside sea water. The steel reinforcing layers (armours 108 and pressure vault 106) are contained within a very confined environment called the annulus, which is located between the innermost sheath that surrounds the inside bore 102, such as inner polymer sheath 104 and the outermost sheath that contacts the sea water, such as external polymer sheath 110. The inner polymer sheath 104 is the barrier to the conveyed production fluids and the external polymer sheath protects 110 against the seawater environment.

If water is present in the annulus, then the longer term integrity of the flexible riser 100 may be compromised due to corrosion. It should be noted that although the inner sheath 104 and outer sheath 110 are impermeable, under high temperature and pressure conditions small amounts of gases can permeate through the inner sheath 104. Corrosive gases are often present in production fluids (e.g. $H_2S$, $CO_2$, and water vapor), plus hydrocarbons such as $CH_4$, and can diffuse through the inner sheath and accumulate in the annular space. This results in a corrosive environment in contact with the carbon steel members, which can significantly reduce the life of the flexible riser 100.

In addition, it is possible that the outer sheath 110 may be damaged during installation, which can allow a slow ingress of seawater over time. If the outer sheath 110 becomes seriously breached, the annulus may become flooded. Also, a slow diffusion of water through the outer sheath 110 is also possible. In all such cases, water enters the annulus causing corrosion of the steel wire structures, which can result in premature failure of the flexible riser 100.

The failure of a flexible riser 100 can be very costly due to lost production and associated installation services, which may vary widely depending on the availability of such services. Also, the failure may result in catastrophic damage to the environment. However, if failures are detected early and monitored, repair or replacement can be scheduled in order to significantly reduce the risk of environmental damage and minimize the down-time of production.

Determination of the presence of liquid in the annulus is presently achieved by periodically monitoring the vented gas flow rate from the annulus and vacuum testing. If water collection occurs, then the gas displaced thereby is vented at surface. However, this approach is not very accurate and small amounts of water intrusion are difficult to detect. In addition, flexible risers 100 are often installed with a buoyancy modules 22 in the middle and, if water collects in the low lying section around a sag bend, gas may become trapped and not vent at the surface. As a result, pressure within the annulus may increase to the point where the outer sheath 110 is ruptured, thereby causing catastrophic failure.

Other approaches to measure the pressure in an annulus have been developed. See, for example, EP 1492936B1 (hereinafter "Technip"). Technip describes a method and device that measures the pressure in the annulus at the bottom of the flexible riser along with the hydrostatic pressure of the seawater column and compares the difference between the two measurements. This approach requires that specific measurements both inside the annulus and outside the flexible riser are made. Also, the method requires a special measurement component at the end of the flexible riser and requires electrical wiring to run to surface with connections between this wiring and the measurement sub. Also, this method and device would not likely be able to identify water collection in low lying areas around a sag bend.

Another existing method involves periodically pulling a vacuum on the vent lines at the surface that connect to the annulus. The degree to which a vacuum can be held is used to give indication of any leaks in the inner or outer sheaths. In practice, this method is generally recognized as difficult to control and not very reliable.

SUMMARY OF DISCLOSURE

In one aspect, one or more embodiments of the present invention relate to a device for determining whether liquid enters a subsea system, the device comprising: a flow line comprising an inside bore capable of carrying producing fluids from a subsea wellhead to a floating production storage and offloading vessel (FPSO), wherein an annulus is defined between an innermost sheath that surrounds the inside bore and an outermost sheath at an exterior of the flow line; a housing element disposed within the annulus and in hydraulic communication with the annulus; a sensor element disposed at a pre-determined location within the housing element; and data acquisition equipment capable of: determining environmental characteristics of the annulus based on measurements made by the sensor element, and determining at least one of the presence, location, and rate of collection of liquids in the subsea system based on the environmental characteristics of the annulus.

In one aspect, one or more embodiments of the present invention relate to a method for determining whether liquid enters a subsea system comprising a flow line having an inside bore capable of carrying producing fluids from a subsea wellhead to a floating production storage and offloading vessel (FPSO), wherein an annulus is defined between an innermost sheath that surrounds the inside bore and an outermost sheath at the exterior of the flow line, the method comprising: disposing a housing element within the annulus and in hydraulic communication with the annulus; disposing a sensor element at a pre-determined location within the housing element; determining environmental characteristics of the annulus based on measurements made by the sensor element; and determining at least one of the presence, location, and rate of collection of liquids in the subsea system based on the environmental characteristics of the annulus.

In one aspect, one or more embodiments of the present invention relate to a system for determining whether liquid enters a subsea system, the system comprising: a flow line coupled from a subsea wellhead to a floating production storage and offloading vessel (FPSO), wherein the flow line comprising an inside bore capable of carrying producing fluids from a subsea wellhead to FPSO, wherein an annulus defined between an innermost sheath that surrounds the inside bore and an outermost sheath at the exterior of the flow line; a plurality of open-ended tubes disposed within the annulus and in hydraulic communication with the annulus; wherein the plurality of open-ended tubes have different lengths; a plurality of fiber optic pressure sensors disposed at a pre-determined locations within the plurality of open-ended tubes, wherein at least one fiber optic pressure sensor is disposed in each of the plurality of open-ended tubes; a plurality of connecting fibers disposed within the plurality of open-ended tubes and spliced to the fiber optic pressure sensors; and data acquisition equipment coupled to the plurality of connecting fibers, wherein the data acquisition equipment is capable of: determining environmental characteristics of the annulus based on measurements made by the sensor element, and determining at least one of the presence, location, and rate of collection of liquids in the subsea system based on the environmental characteristics of the annulus.

Other aspects and advantages of the invention will be apparent from the following description and the appended claims.

DETAILED DESCRIPTION

Figure 1:
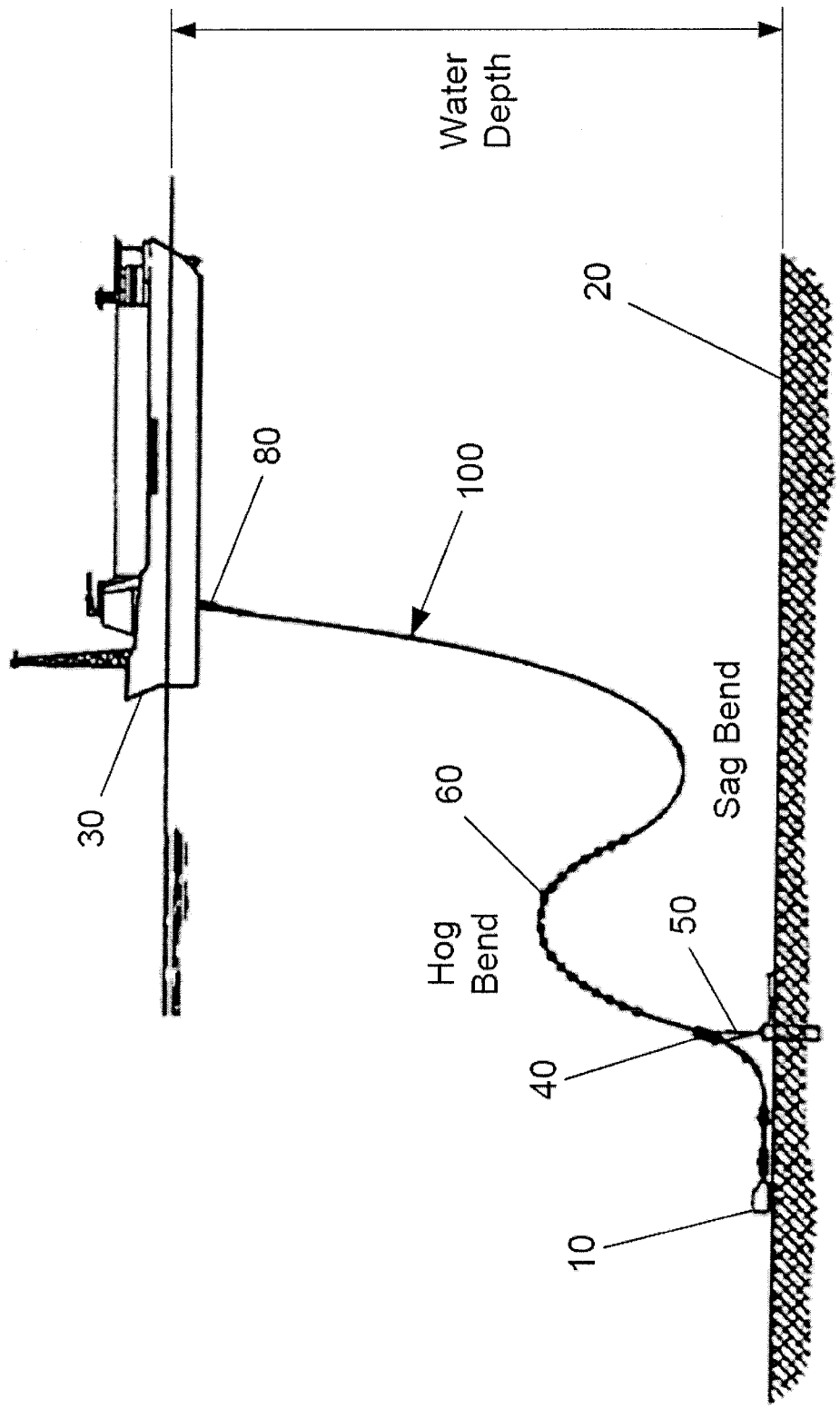
FIG. 1 shows a typical subsea production system using a flexible riser.
Figure 2:
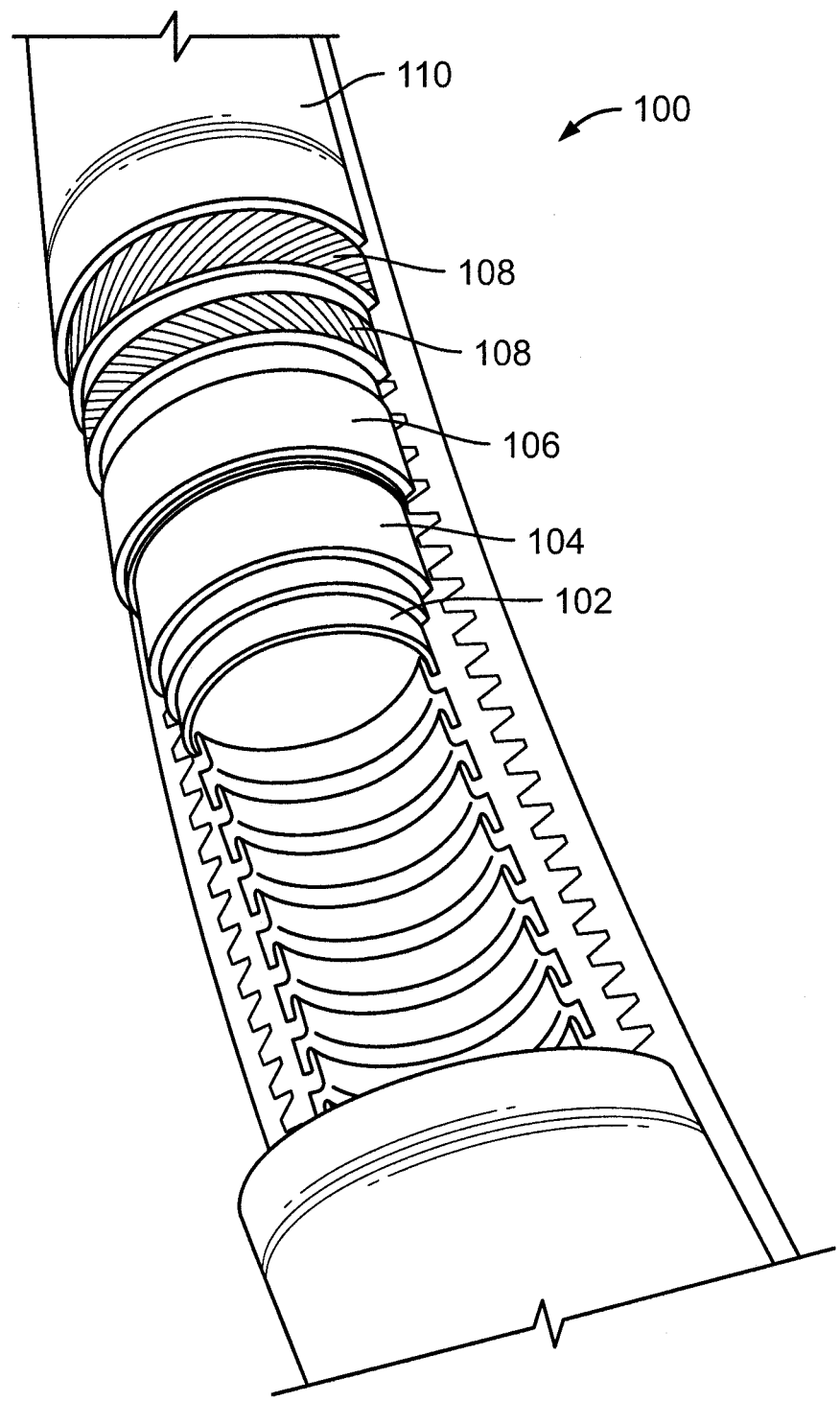
FIG. 2 shows a cut-away view of a conventional flexible riser.

Specific embodiments of the present disclosure will now be described in detail with reference to the accompanying Figures. Like elements in the various figures may be denoted by like reference numerals for consistency.

Further, in the following detailed description of embodiments of the present invention, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

Figure 3:
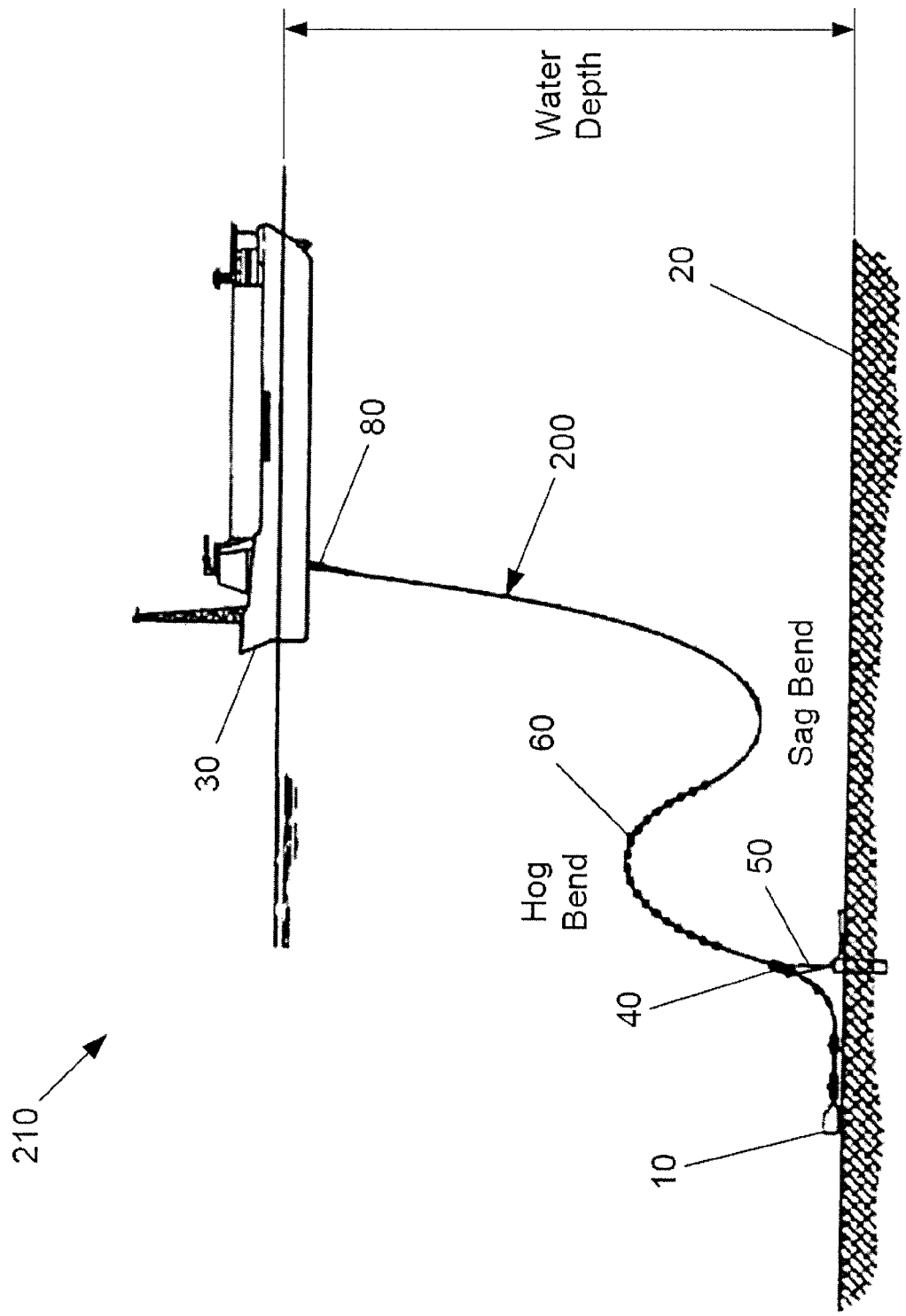
FIG. 3 shows a deployed flexible riser in accordance with one or more embodiments of the present invention.

Referring to FIG. 3, in one aspect, embodiments disclosed herein generally relate to a system for determining the presence of liquids in the annulus of a flow line such as flexible riser 200 in a subsea system 210. One or more embodiments use specific measurements by sensor elements, such as optical interrogation of fibers, to determine environmental characteristics, such as pressure, at one or more locations within the flexible riser 200. The system involves a subsea wellhead 10 on the seabed 20 coupled to an FPSO 30 through flow lines such as flexible riser 200. Additionally, a riser clamp 40 and tethers 50 may be employed to retain the end of the flexible riser 200 to the seabed 20, while buoyancy modules 60 may be connected to various positions along the flexible riser 200 and a bend stiffener 80 may be included at the connection to FPSO 30 so as to allow for surface movement of the FPSO 30 and movements due to wave action without putting undue stress upon the flexible riser 200.

Figure 4:
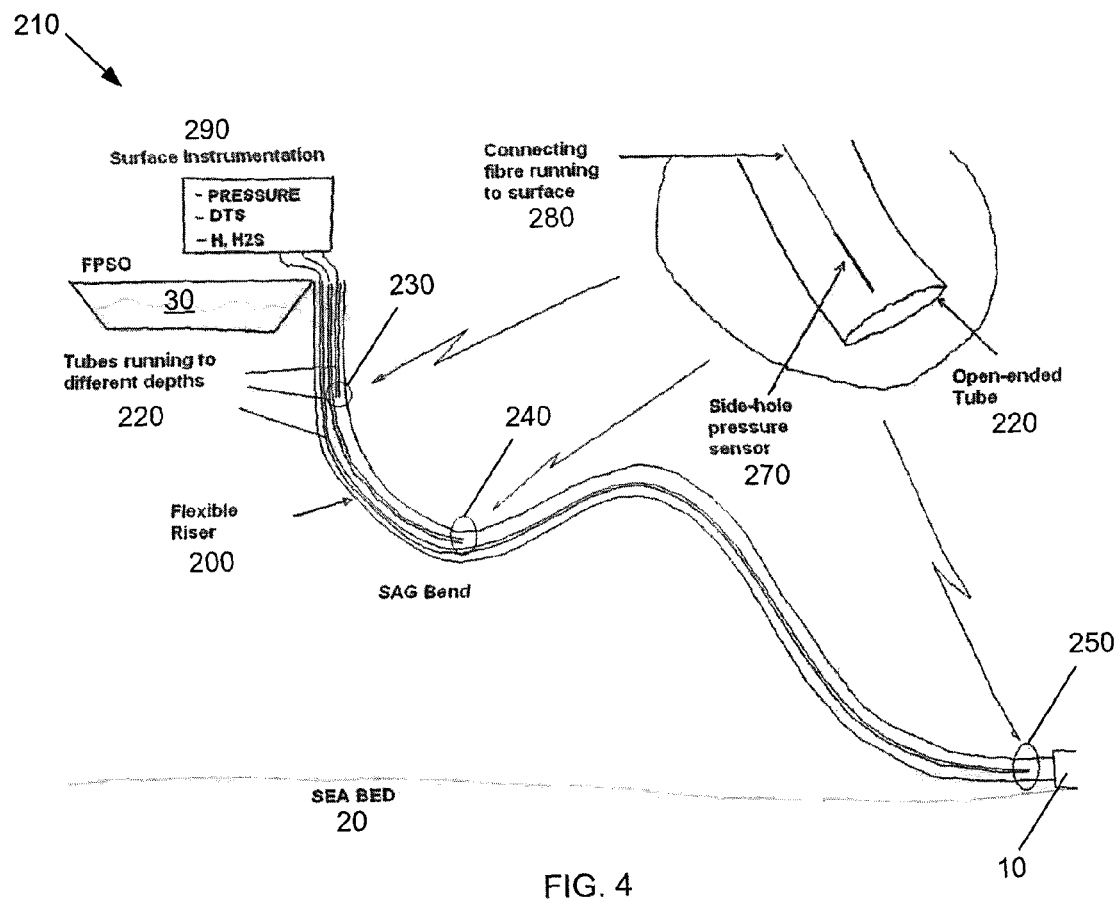
FIG. 4 shows a system having a three sensor configuration in accordance with one or more embodiments of the present invention.

FIG. 4 shows a schematic representation of a system 210 according to one or more embodiments of the present invention. The system 210 employs a flexible riser 200 having sensor elements located at various locations along the length of flexible riser 200, for example, at positions 230, 240, and 250. Multiple housing elements, such as open-ended tubes 220, are placed in the annulus of the flexible riser 200. As shown in the enlarged inset of FIG. 4, each of the open-ended tubes 220, which are wound in the annulus of the flexible riser 200, is provided with a sensor element, such as a fiber optic pressure sensor 270, placed close to the open-end. The multiple open-ended tubes 220 are of different lengths so as to run within the flexible riser 200 to the pre-determined locations 230, 240, and 250. Thus, if water enters into the annulus of the flexible riser 200, the water will collect at the low points 240 and 250, where the ends of open-ended tubes 220 are located.

In one or more embodiments, the fiber optic pressure sensors 270 may be spliced to a connecting fiber 280 that runs from data acquisition equipment, such as surface instrumentation 290 on the FPSO 30. The connecting fiber 280 may be interrogated from the surface using the surface instrumentation 290 to give any or all of the following measurements: the pressure at the end of the fiber, distributed temperature along the fiber from surface, and the optical attenuation along the fiber, which can give an indication of hydrogen presence in the annulus and water ingression.

The use of fiber optic sensors to measure hydrogen in an annulus has been described in U.S. Patent Application Ser. No. 60/989,688, filed on Nov. 21, 2007, assigned to the same assignee as the present application, and the entirety of which is incorporated herein by reference. Also, the use of optical fiber pressure sensors for measuring water ingression is described in U.S. Patent Application Ser. No. 60/990,147, filed on Nov. 26, 2007, assigned to the same assignee as the present application, and the entirety of which is also hereby incorporated by reference.

In one or more embodiments, at least one fiber optic pressure sensor 270, which is spliced to a connecting fiber 280 and embedded in the annulus of the flexible riser 200, may be a side-hole polarimetric fiber sensor that creates birefringence and provides measurement resolution of less than about 0.01 PSI (pounds per square inch). In one or more embodiments, other types of fiber optic sensors 270 may be used, such as those using a fiber Bragg grating as described in Yamate, T, Ramos, R. T., Schroeder, R. J., Udd, E, "Thermally Insensitive Pressure Measurements up to 300 C Using Fiber Bragg Gratings Written onto Side Hole Single Mode Fiber," 14th International Conference on Optical Fiber Sensors OFS— Venice, Italy, 11-13 Oct. 2000, the entire contents of which is incorporated herein by reference.

In one or more embodiments, the phenomena known as "pressure induced birefringence" may be used to measure the pressure that a "side-hole" fiber experiences. A side-hole fiber is a section of an optical fiber having two holes offset from the center of the fiber and running along the length of the sensing element. The principle is described in detail in Clowes, J. R. and Zervas, M. N, "Pressure Sensitivity of Side-Hole Optical Fibre Sensors," IEEE Photonics Technology Letters, Vol. 10, No. 6, June 1998 and in Clowes, J. R, McInnes, J., Zervas, M. N. and Payne, D. N, "Effects of High Temperature and Pressure on Silica Optical Fibre Sensors," 12th International Conference on Optical Fibre Sensors, 1997 OSA Technical Digest Series, Vol. 16, Optical Society of America, both of which are incorporated by reference in their entirety.

The connecting fiber 280 with the fiber optic pressure sensor 270 spliced on its end may be contained within the open-ended tube 220 that is installed in the annulus of the flexible riser 200 during the manufacturing thereof. The process of installing such a tube in the annulus of a flexible riser is known in the art. It should be noted that the housing elements may be open-ended tubes 220 as shown, or alternatively, the housing elements may have slots or openings so as to allow hydraulic communication with the annular space. Therefore, if water collects in the annulus to a level above the open-end of the tube 220, (or the slots or openings in alternate housing elements), then the level of water within the housing element will be the same as in the annulus. The fiber optic pressure sensors 270 may measure the hydrostatic head of water above the measurement point. This measurement provides an indication of water in the annulus. In addition, monitoring changes in this pressure with time may give an indication of the rate of water collection.

Because embodiments of the present invention use of optical fiber pressure sensors, the overall device or instrument may have a very small diameter, preferably less than about 1 millimeter (mm) The small diameter allows the fiber optic to be easily fit within any tube located in the annular space. As discussed above, the fiber optic pressure sensor 270 comprises a section of fiber spliced to a connecting optical fiber 280, which passes through the flexible riser 200. The connecting fiber 280 may be interrogated by surface instrumentation 290 to determine distributed temperature measurements. These measurements may be used to identify so-called "cold spots" in which seawater has diffused into the annulus. Thus, a location indication, which may facilitate repair of the flexible riser, may be obtained. In addition, interrogating the same optical fiber may also provide an indication of the presence of hydrogen in the annulus.

Optical interrogation of fibers is a technology that has been available for many years and currently has several commercial applications. For example, distributed temperature sensing (DTS) makes use of the Raman backscattered Stokes and anti-Stokes wavelengths in the optical fiber. DTS can provide a distributed temperature measurement along the fiber. This technique has been used in many applications, such as fire detection, power line monitoring, downhole oilfield applications, and measuring temperature variations along the side of a flexible riser on a subsea platform offshore.

One or more embodiments may include the use of at least one open-ended tube 220 with a connecting fiber 280 and a fiber optic pressure sensor 270 deployed therein. As discussed above, the open-ended tube 220 can be wrapped within the armor layers of the flexible riser 200 during the manufacture thereof using well known techniques such as those described in: Felix-Henry, A. "Prevention and Monitoring of Fatigue-corrosion of Flexible Risers' Steel Reinforcements" OMAE2007-29186, Proceeding of the 26th International Conference on Offshore Mechanics and Arctic Engineering, June 10-15, 2007, San Diego, Calif., USA, the entirety of which is incorporated by reference.

Figure 5:
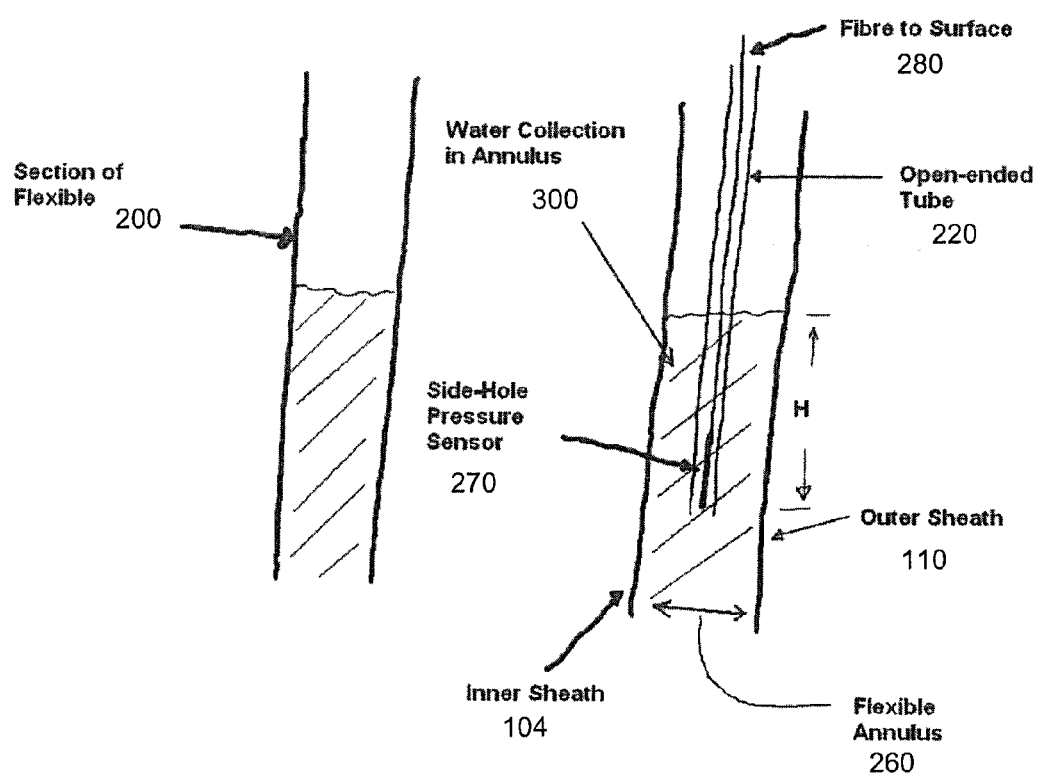
FIG. 5 shows water collection in the annulus of a flexible riser in accordance with one or more embodiments of the present invention.

Referring to FIG. 5, the operation of the system will be discussed with reference to a schematic of a section of the flexible riser 200 in accordance with one or more embodiments of the present invention. As water level 300 rises in the annular space 260 and into the open-ended tube 220, the fiber optic pressure sensor 270, which is spliced to the connecting fiber 280 in the open-ended tube 220, measures the increase in pressure due to the hydrostatic head H of water above the sensor 270. Thereby, using surface instrumentation 290 that interrogates the fiber optic pressure sensor 270, the level, or the rate of rise, of the water 300 in the annulus As discussed above, possible methods of obtaining the connecting fiber 280 with the fiber optic pressure sensor 270 spliced on the end include, but are not limited to, deploying the fiber within the open-ended tube 220 during manufacturing of the flexible riser 200. In such a case, the connecting fiber 280 may be placed inside the open-ended tube 220 using well established techniques in the industry. There are many ways to achieve this and there exist several companies that provide small tubing with fiber already deployed inside, for example, the commercially available SENSATUBE. The open-ended tube 220 may then be wrapped with wire supporting members during manufacture of the flexible riser 200 in accordance with known techniques.

It is also possible to place multiple connecting fibers 280, each with a fiber optic pressure sensor 270 spliced on the end, within the one or more open-ended tubes 220 before incorporation within the flexible riser 200. These connecting fibers 280 may be of different lengths so that pressure is measured at multiple points along the flexible riser 200, preferably including any sag bends in the flexible riser 200.

It may be necessary to provide hydraulic connectivity between the inside of the housing element and the annulus in the proximity of each sensor element, depending on how the open-ended tube 220 is incorporated into the annulus. This may be achieved by placing small holes or slots in the open-ended tube 220. In one or more embodiments, one such pressure measurement would be made close to surface giving the surface annular pressure and other sensors would be placed at low lying points, such as at the bottom of the flexible riser 200 near the seabed 20 and at the bottom of any sag bends.

As stated above, in accordance with one or more embodiments, any number of housing elements may be deployed in the flexible structure each running to different lengths within the flexible riser, each open-ended to provide hydraulic communication with the annular space and each with connecting fiber and a fiber pressure sensor close to the open-end. This may provide pressure measurements at multiple locations within the flexible. While a three sensor system was shown, those of ordinary skill in the art will appreciate there may be more or less sensors, depending on the deployment configuration of the flexible riser 200.

In accordance with one or embodiments, another methodology of deployment of the connecting fiber 280 with fiber optic pressure sensor 270 spliced on the end is to incorporate the open-ended tube (or tubes) 220 within the flexible annulus structure 260 during manufacture, but without including the connecting fiber 280 and fiber optic pressure sensor 270. The connecting fiber 280 with the fiber optic pressure sensor 270 spliced on the end may then be pumped into the open-ended tube (or tubes) 220. The deployment methodology is well known in the art. Additionally, the fluid used to pump the connecting fiber 280 with the fiber optic pressure sensor 270 spliced on the end into the open-ended tube 220 may be a corrosion inhibitor.

Once the connecting fibers 280 with fiber optic pressure sensors 270 are installed, the surface end of the connecting fiber 280 may be connected to various different interrogation equipment, such as surface instrumentation 290 on the FPSO 30, which may provide real-time, or periodic, pressure measurements at each fiber optic pressure sensor 270. Changes in the pressure measurements with time may be used to determine whether water is collecting at various points in the annulus of the flexible riser 200. Additionally, the pressure measurements may also be used to determine the change in the water level 300 with time. For example, a sudden increase in water level will give an indication of a flooding of the annulus, whereas a slow increase in level may be an indication of a small leak or condensation.

In addition, if a fiber optic pressure sensor 270 located in a sag bend is showing water collection, but another fiber optic pressure sensor 270 located at the bottom of the flexible riser 200 shows no presence of water, then it can be deduced that a leak is occurring above the sag bend. By comparing the changes in pressure at different points within the flexible riser 200, it may be possible to better diagnose the position and cause of the leak in the inner sheath 104 or outer sheath 110.

One or more of the connecting fibers 280, which connect the fiber optic pressure sensor 270 to data acquisition equipment, such as surface instrumentation 290, may also be interrogated for DTS, according to known techniques. This may provide a continuous real-time log of temperature along the annulus of the flexible riser 200. If there is a breach of the outer sheath 110, then it would be expected that a "cold spot" is detected by the fiber optic pressure sensor 270 where the cold seawater enters the annulus of the flexible riser 200. This cold spot may give an indication of the location of the leak and facilitate the repair thereof.

One or more embodiments of the present invention may provide one or more of the following advantages. First, the tube and fiber optic configurations may be made in a very small size. The sensing element is a section of optical fiber which may have a diameter of about 200 microns and of length of a few tens of centimeters. This allows deployment of the sensors into very small size tubes which fit into the annulus of a flexible riser.

Second, the use of these types of sensors may give a direct measurement of pressure with a very high resolution. One or more embodiments may measure changes in pressure of less than 0.01 PSI (pounds per square inch). This may facilitate the identification of small amounts of water collection in the annulus.

Third, the sensor may be interrogated at surface, which removes the need for electronics or electrical connections within the flexible, thus simplifying the system design, deployment, and operation.

Finally, because fiber optic pressure sensors may be spliced to a connecting fiber running to surface, the connecting fiber between surface and the sensor may be interrogated to give distributed temperature and distributed attenuation. DTS and distributed attenuation measurements may provide complimentary measurements to help identify leak location and the presence of hydrogen or $H_2S$ in the annulus. It should be noted that, typically, corrosion generates hydrogen. Thus, the detection of hydrogen may also be used to identify zones where corrosion is taking place inside the annulus.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the invention should be limited only by the attached claims.

What is claimed is:

1. A device for determining whether liquid enters a subsea system, the device comprising:
    a flow line comprising an inside bore capable of carrying producing fluids from a subsea wellhead to a floating production storage and offloading vessel (FPSO), wherein an annulus is defined between an innermost sheath that surrounds the inside bore and an outermost sheath at an exterior of the flow line;
    a housing element comprising an open-ended tube disposed within and along the length of the annulus and in hydraulic communication with the annulus;
    a sensor element disposed within and along the length of the open-ended tube; and
    data acquisition equipment capable of:
        determining environmental characteristics of the annulus based on measurements made by the sensor element, and
        determining at least one of the presence, location, and rate of collection of liquids in the subsea system based on the environmental characteristics of the annulus.

2. The device according to claim 1 further comprising a plurality of housing elements and a plurality of sensor elements, wherein at least one sensor element is disposed in each of the plurality of housing elements.

3. The device according to claim 1 further comprising a plurality of open-ended tubes, wherein the open-ended tubes run to a plurality of pre-determined locations within the housing element.

4. The device according to claim 1, wherein the sensor element comprises fiber optic pressure sensor.

5. The device according to claim 4, wherein the fiber optic pressure sensor is spliced to a connecting fiber coupled to the data acquisition equipment.

6. A method for determining whether liquid enters a subsea system comprising a flow line having an inside bore capable of carrying producing fluids from a subsea wellhead to a floating production storage and offloading vessel (FPSO), wherein an annulus is defined between an innermost sheath that surrounds the inside bore and an outermost sheath at the exterior of the flow line, the method comprising:
    disposing a housing element comprising an open-ended tube within and along the length of the annulus and in hydraulic communication with the annulus;
    disposing a sensor element within and along the length of the open-ended tube;
    determining environmental characteristics of the annulus based on measurements made by the sensor element; and
    determining at least one of the presence, location, and rate of collection of liquids in the subsea system based on the environmental characteristics of the annulus.

7. The method according to claim 6 further comprising:
disposing a plurality of housing elements within the annulus; and
disposing a plurality of sensor elements within the plurality of housing elements, wherein at least one sensor element is disposed in each of the plurality of housing elements.

8. The method according to claim 7 further comprising disposing a plurality of open-ended tubes within the annulus, wherein the open-ended tubes run to a plurality of pre-determined locations within the housing element.

9. The method according to claim 6, wherein the sensor element comprises fiber optic pressure sensor.

10. The method according to claim 9 further comprising: splicing the fiber optic pressure sensor to a connecting fiber; and coupling the connecting fiber to the data acquisition equipment.

11. The method according to claim 6, wherein the sensor element is disposed within the housing element during manufacture of the flow line.

12. The method according to claim 6, wherein the sensor element is disposed within the housing element after manufacture of the flow line.

13. A system for determining whether liquid enters a subsea system, the system comprising:
a flow line coupled from a subsea wellhead to a floating production storage and offloading vessel (FPSO), wherein the flow line comprising an inside bore capable of carrying producing fluids from a subsea wellhead to FPSO, wherein an annulus defined between an innermost sheath that surrounds the inside bore and an outermost sheath at the exterior of the flow line;
a plurality of open-ended tubes disposed within and along the length of the annulus and in hydraulic communication with the annulus;
wherein the plurality of open-ended tubes run to a plurality of pre-determined locations within the annulus;
a plurality of fiber optic pressure sensors disposed in proximity of the open end of the plurality of open-ended tubes, wherein at least one fiber optic pressure sensor is disposed within and along the length of each of the plurality of open-ended tubes;
a plurality of connecting fibers disposed within the plurality of open-ended tubes and spliced to the fiber optic pressure sensors; and
data acquisition equipment coupled to the plurality of connecting fibers, wherein the data acquisition equipment is capable of:
determining environmental characteristics of the annulus based on measurements made by the sensor element, and
determining at least one of the presence, location, and rate of collection of liquids in the subsea system based on the environmental characteristics of the annulus.

14. The system according to claim 13, wherein the flow line is manufactured with the plurality of open-ended tubes, the plurality of fiber optic pressure sensors, and the plurality of connecting fibers disposed therein.

* * * * *